UNITED STATES PATENT OFFICE.

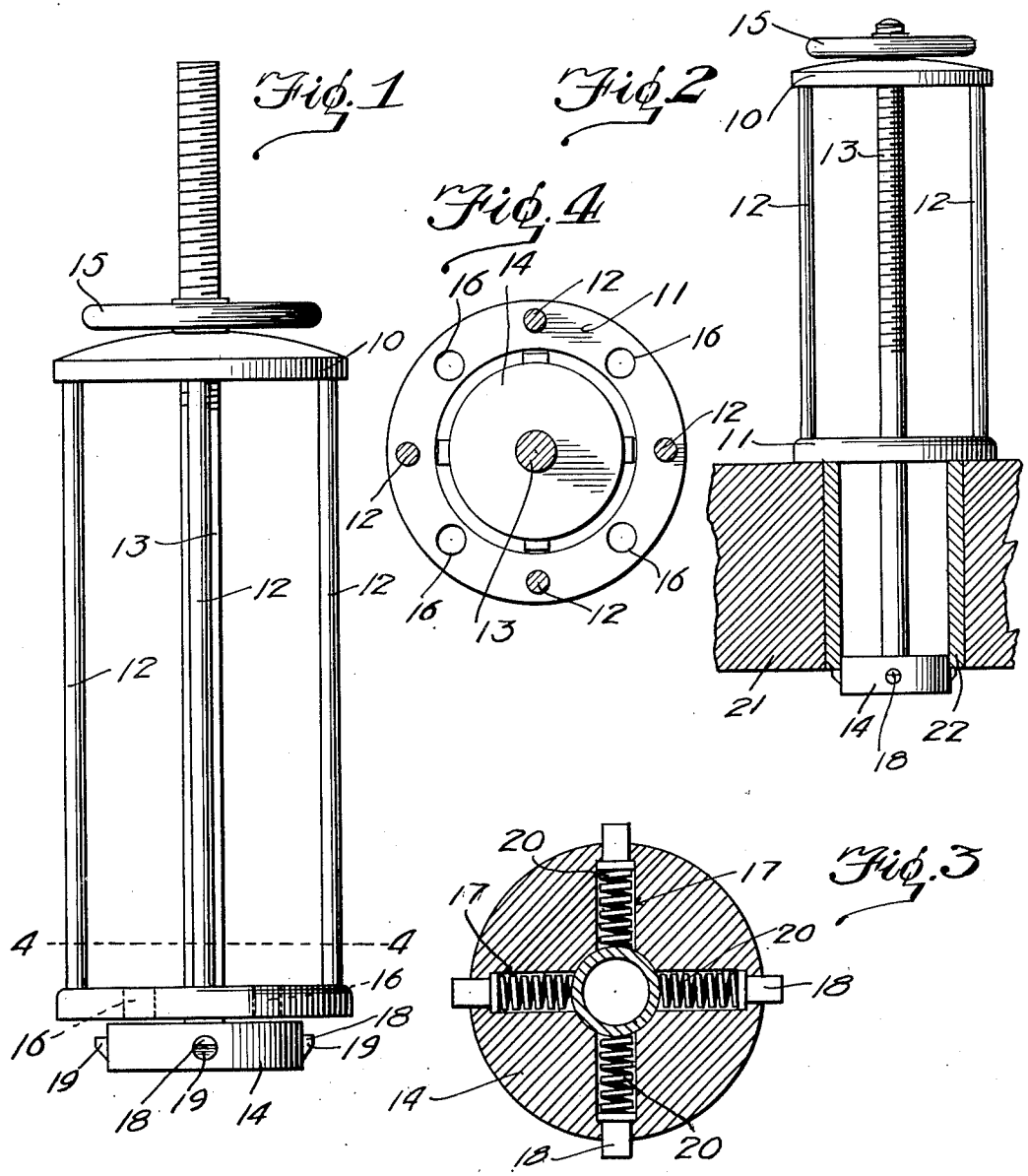

JAMES BERNARD RIGGS, OF GLENHAYES, WEST VIRGINIA.

BUSHING-EXTRACTOR.

1,359,432.   Specification of Letters Patent.   Patented Nov. 16, 1920.

Application filed January 9, 1920. Serial No. 350,299.

*To all whom it may concern:*

Be it known that JAMES BERNARD RIGGS, a citizen of the United States, residing at Glenhayes, in the county of Wayne and State of West Virginia, have invented new and useful Improvements in Bushing-Extractors, of which the following is a specification.

It is a common practice to remove liners, bushings and the like from bearings with a hammer and chisel, the practice which not only destroys the bushing beyond further use, but one which is very laborious and requires considerable time. It is therefore the purpose of my invention to provide a device through the instrumentality of which liners, bushings and the like can be quickly and easily removed without damaging the same, in view of which fact the bushing or liner can be turned a number of times for further use.

To this end, the invention makes use of an extracting rod provided with a plurality of spring pressed lugs which are carried by the head of said rod, and designed to pass through the bushing and when projected to engage the lower edge thereof, so that when the rod is operated, the bushing or liner will be readily extracted from the bearing.

The nature and advantages of the invention will be better understood when the following detail description is taken in connection with the accompanying drawings, the invention residing in the construction, combination and arrangement of parts as claimed.

In the drawing forming part of this specification like numerals of reference indicate similar parts in the several views and wherein:—

Figure 1 is a view in elevation of the device forming the subject matter of my invention.

Fig. 2 is a view showing the manner of using the device, the bearings and bushings being shown in section.

Fig. 3 is a horizontal sectional view through the head of the extractor rod.

Fig. 4 is a sectional view taken on line 4—4 of Fig. 1.

The device forming the subject matter of my invention comprises a plate 10, which as shown in this instance is of circular outline, and a ring 11. The plate 10 and ring 11 are connected together in spaced relation by means of a plurality of rods 12, any number of which may be employed depending upon the size of the device. Slidable through an opening in the plate 10 is an extracting rod 13 which is provided at its lower end with a circular head 14. The rod 13 is threaded for a portion of its length, and has associated therewith an operating wheel 15, disposed above the plate 10 and threaded upon the rod 13, so that by turning the wheel 15, in the proper direction, the head 14 will be moved either toward or away from the ring 11. The head 14 is of such diameter that it will pass through the ring 11. The ring 11 is provided with a plurality of openings 16, through which fastening elements may be passed for securing the device to a fixed support.

As shown in Fig. 3, the head 14 is provided with a plurality of openings 17 in the periphery thereof, and projecting through each opening is a lug 18. The lugs have their ends beveled as at 19 and are yieldably supported for movement within said openings by means of springs 20. By reason of this construction, it is apparent that when the head 14 enters the bushing or liner to be extracted, the beveled faces 19 of the lugs slide over the upper edge of the bushing forcing the lugs within the head, and permitting the latter to pass freely through the bushing. When the head is projected from the opposite end of the bushing, the lugs 18 are extended from said opening under the action of the springs 20 and engage the bushing and liner beneath the adjacent end thereof. The wheel 15 is then rotated in the proper direction to elevate the rod 13, and as the head 14 is drawn through the bearing 21, the bushing 22 is easily extracted without injury thereto.

While it is believed that from the foregoing description the nature and advantages of the invention will be readily apparent, I desire to have it understood that I do not limit myself to the exact construction and arrangement of parts shown, the same being merely illustrative, and that such changes may be resorted to when desired as fall within the scope of what is claimed.

Having thus described my invention what I claim as new is:—

1. A device of the class described comprising a support, a rod mounted upon the support for sliding movement, means for actuating said rod, a head on the lower end of said rod, and spring pressed lugs carried by said head and normally projected through openings therein.

2. A device of the class described comprising a support, a rod mounted upon the support for sliding movement, said rod being threaded for a portion of its length, a wheel threaded upon said rod and operable to slide the rod in operative directions upon the support, a head on the lower end of said rod, and spring pressed lugs carried by said head and normally projected through openings therein.

3. A device of the class described comprising a plate, rods depending from said plate, a ring supported upon the lower ends of said rods in parallelism with said plate, a rod arranged to slide through an opening in said plate means associated with the rod for actuating the latter, a head on the lower end of said rod, and spring pressed lugs carried by said head and normally projected through openings therein.

4. A device of the class described comprising a plate, rods depending therefrom, a ring carried by the lower ends of said rod, and arranged in parallelism with said plate, an operating rod slidable through an opening in said plate, means for actuating said rod, a head carried by the lower end of said rod and adapted to pass through said ring, and spring pressed lugs carried by said head and normally projected through openings therein.

5. A device of the class described comprising a plate, rods depending from said plate and a ring carried by the lower ends of said rod and arranged in parallelism with said plate, an operating rod slidable through an opening in said plate, said rod being threaded for a portion of its length, a head carried by the lower end of said rod and adapted to pass through said ring, a wheel associated with the threaded portion of said rod and adapted to actuate the rod upon turning of said wheel, and spring pressed lugs carried by said head and normally projected through openings therein.

In testimony whereof I affix my signature.

JAMES BERNARD RIGGS.